(12) United States Patent
Owens, Jr. et al.

(10) Patent No.: US 11,603,931 B2
(45) Date of Patent: Mar. 14, 2023

(54) END FACE MECHANICAL SEAL ASSEMBLY WITH HIGH TEMPERATURE SECONDARY SEAL

(71) Applicant: Flowserve Management Company, Irving, TX (US)

(72) Inventors: Glenn Robert Owens, Jr., Kalamazoo, MI (US); Jack Robert Vasko, Wallingford, PA (US)

(73) Assignee: Flowserve Management Company, Irving, TX (US)

( * ) Notice: Subject to any disclaimer, the term of this patent is extended or adjusted under 35 U.S.C. 154(b) by 169 days.

(21) Appl. No.: 17/312,510

(22) PCT Filed: Dec. 16, 2019

(86) PCT No.: PCT/US2019/066510
§ 371 (c)(1),
(2) Date: Jun. 10, 2021

(87) PCT Pub. No.: WO2020/131683
PCT Pub. Date: Jun. 25, 2020

(65) Prior Publication Data
US 2022/0049771 A1    Feb. 17, 2022

Related U.S. Application Data

(60) Provisional application No. 62/782,792, filed on Dec. 20, 2018.

(51) Int. Cl.
*F16J 15/10*    (2006.01)
(52) U.S. Cl.
CPC .......... *F16J 15/102* (2013.01); *F16J 15/104* (2013.01)

(58) Field of Classification Search
CPC .......... F16J 15/10; F16J 15/102; F16J 15/104; F16J 15/12; F16J 15/121; F16J 15/127
See application file for complete search history.

(56) References Cited

U.S. PATENT DOCUMENTS 4,386,785 A * 6/1983 Back .................. F16D 1/096
277/391
5,577,738 A   11/1996 Fukuda
(Continued)

FOREIGN PATENT DOCUMENTS

JP    5216642 B2    6/2013
JP    6434830 B2    12/2018

OTHER PUBLICATIONS

Office Action for Arab State of the Gulf Patent Appl No. 201938875, dated Oct. 25, 2020, 5 Pages.
(Continued)

*Primary Examiner* — Gilbert Y Lee
(74) *Attorney, Agent, or Firm* — Maine Cernota & Rardin (57) ABSTRACT

A high temperature secondary seal between a rotating seal face adaptor sleeve and a rotating shaft does not consume additional axial space beyond the axial space occupied by the secondary seal. The seal includes a single ring drive collar comprising a plurality of radial directed bolts in tapped holes. As the bolts are tightened they enter a cylindrical cavity in the drive collar and impact therein a sloped surface of a crush ring. The vertical force thereby applied to the crush ring displaces the crush ring axially into a secondary graphite sealing element, thereby crushing the secondary sealing element against the adaptor sleeve and shaft, and forming a seal there between. The crush ring sloped surface can terminate in a vertical face, so that upon sufficient displacement of the crush ring the bolts abut the vertical face and impact the shaft, fixing the drive collar to the shaft.

11 Claims, 5 Drawing Sheets

(56) References Cited

U.S. PATENT DOCUMENTS

2003/0042681 A1  3/2003  Takahashi
2005/0077684 A1  4/2005  Roddis

OTHER PUBLICATIONS

International Search Report and Written Opinion for PCT Application No. PCT/US2019/066510 dated Apr. 14, 2020, 11 pages.
International Preliminary Report on Patentability for PCT Application No. PCT/US2019/066510 dated Jun. 16, 2021, 8 pages.

* cited by examiner

END FACE MECHANICAL SEAL ASSEMBLY WITH HIGH TEMPERATURE SECONDARY SEAL

RELATED APPLICATIONS

This application is a national phase application of international application PCT/US2019/066510, field on Dec. 16, 2019, which claims the benefit of U.S. Provisional Application No. 62/782,792, filed Dec. 20, 2018. Both of these applications are herein incorporated by reference in their entirety for all purposes.

FIELD OF THE INVENTION

The invention relates to rotating shaft seals, and more particularly, to high temperature secondary seals included in end face mechanical seal assemblies.

BACKGROUND OF THE INVENTION

An end face mechanical seal is a rotating shaft seal that is formed by close proximity of two flat, annular, non-contacting seal faces, usually referred to as a stationary seal face and a rotating seal face, in that one face is typically static and sealed to a housing, while the other face is sealed to the rotating shaft and rotates with the shaft. The two seal faces are annular, and coaxial with the rotating shaft, whereby the long axis of the shaft is also the common axis of the annular seal faces.

Traditionally the two seal faces are lapped flat to a very high degree of flatness, which allows the faces to be configured in a parallel relationship whereby they are not physically in contact with each other, but are separated by a gap that can be as narrow as one micron or less. The gap itself is also annular in shape, and shares a common central axis with the two annular seal faces, and with the rotating shaft. Geometrically, the configuration of a mechanical seal is such that, if each of the annular seal faces were considered to lie in a plane, then the planes of the annular seal faces would be parallel to each other, and both would be perpendicular to the central axis of the rotating shaft.

The gap between the seal faces in an end face mechanical seal is filled with a film formed by fluid that is radially forced into the gap from either or both of the inner and outer boundaries of the gap due to differential pressure between the inner and outer boundaries. The film serves to lubricate the gap, and to maintain the separation of the faces so that they do not mechanically wear against each other. Often, but not always, this lubricating fluid is process fluid. In most cases it is not practical to permanently fix the rotating seal face to shaft. Instead, the rotating seal face is typically fixed to an adaptor sleeve that is installed onto the shaft. This approach requires that an additional, "secondary seal" be provided between the shaft and the adaptive sleeve".

During operation, an end face mechanical seal is necessarily subjected to both the temperature and pressure of the process fluid. For applications at moderate temperatures, elastomeric gaskets and/or O-rings are typically used to form the secondary seals. However, the use of a secondary seal that includes a gasket and/or O-ring can limit the maximum temperature at which a mechanical seal can operate, due to temperature limitations of the elastomer. A typical upper limit is about 400° F., above which non-elastomeric secondary seals are required. Providing a non-elastomeric seal between the stationary seal face and the housing, and between the rotating seal face and the seal face adaptor sleeve, is typically a straightforward engineering task. However, providing a non-elastomeric secondary seal between the seal face adaptor sleeve and the shaft can be problematic, due in part to the restricted space that is available in the region of the seal face adaptor sleeve.

Figure 1:
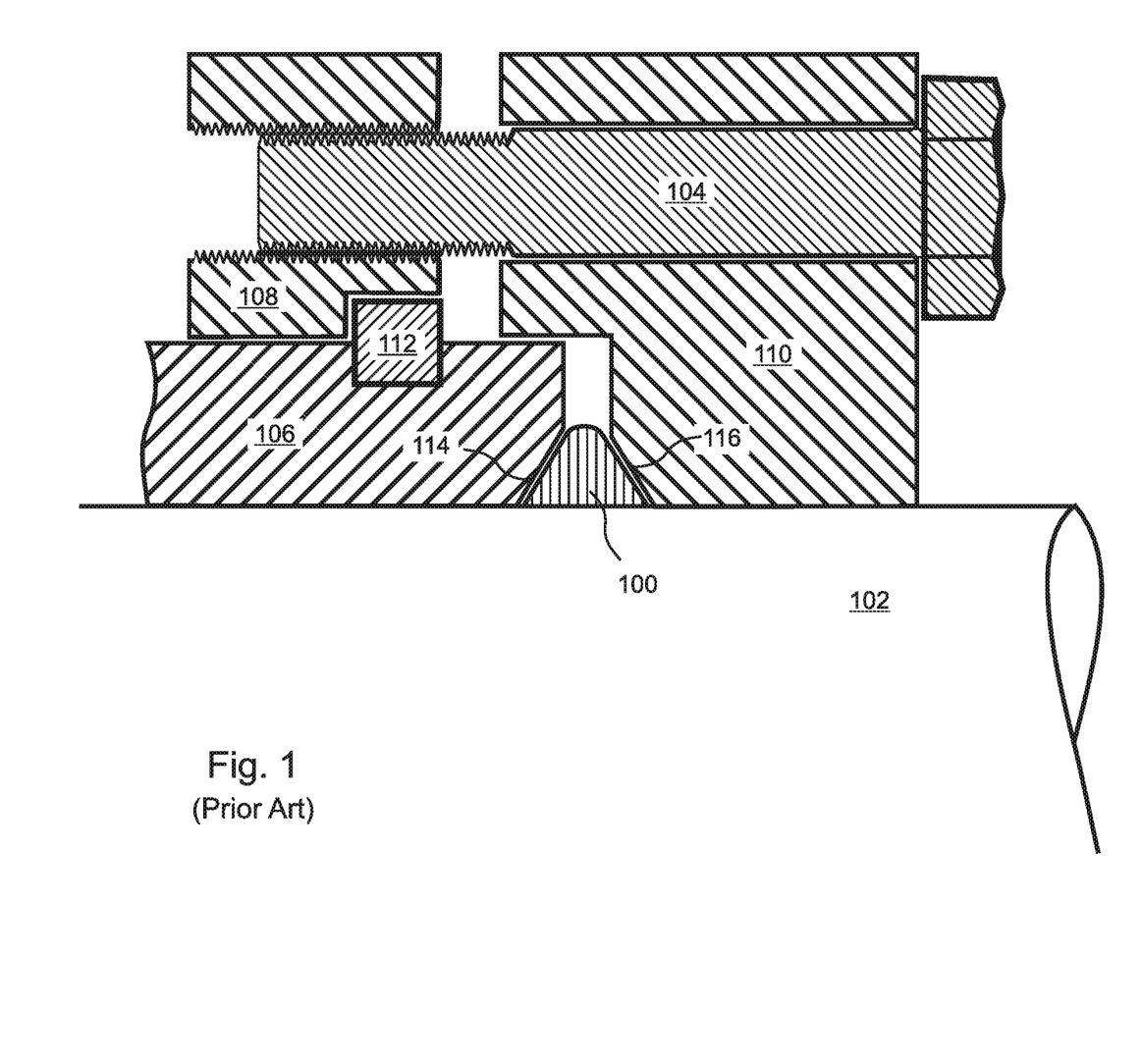
FIG. 1 is a cross sectional illustration of a high temperature secondary seal of the prior art.

With reference to FIG. 1, in high temperature applications the rotating seal face of an end face mechanical seal typically includes a seal adaptor sleeve 106 that is rotationally and axially fixed to the shaft 102, and is sealed to the shaft 102 by a compressible graphite secondary sealing element 100, whereby a crushing force is applied to the sealing element 100 so as to press the sealing element 100 against the shaft 102 and against the seal face adaptor sleeve 106.

In the example illustrated in FIG. 1, the compression of the graphite secondary sealing element 100 is accomplished by using a dual-ring drive collar 108, 110 comprising a clamping ring 108 and a drive ring 110. The two rings 108, 110 of the drive collar are joined to each other by a plurality of threaded fasteners, such as bolts 104, that are axially aligned. The clamping ring 108 is prevented from axial movement toward the drive ring 110 by a split ring 112 or similar mechanism. Accordingly, tightening the bolts 104 acts to draw the drive ring 110 toward the clamping ring 108, thereby compressing the secondary sealing element 100 between a beveled face 114 of the rotating seal face adaptor sleeve 106 and a corresponding beveled face 116 of the drive ring 110, so that a seal is formed between the inner diameter of the sleeve 106 and the outer diameter of the shaft 102.

The mechanical seal between the rotating and static seal faces (not shown, located to the left of FIG. 1) prevents process fluid from reaching the region surrounding the drive collar 108, 110, and the compressed graphite element 100 prevents process fluid from seeping between the seal face adaptor sleeve 106 and the shaft 102.

The approach of FIG. 1 is effective at making a high temperature secondary seal between the seal face adaptor sleeve and the shaft. However, considerable axial space must be reserved in support of the secondary seal, beyond the axial space that is occupied by the drive collar 108, 110 and other elements of the secondary seal. This additional axial space is required during installation of the secondary seal so as to account for the uninstalled axial length of the threaded fasteners 104, and also to provide axial space to accommodate the tooling that is used to install the fasteners 104. In many applications, axial space is at a premium, such that the axial space requirements of such conventional secondary seals is problematic.

What is needed, therefore, is a high temperature seal design that is able to form a secondary seal between a rotating seal face adaptor sleeve and an underlying rotating shaft without requiring reservation of additional axial space beyond what is occupied by the axial length of the secondary seal itself.

SUMMARY OF THE INVENTION

A high temperature seal design is disclosed that is able to form a secondary seal between a rotating seal face adaptor sleeve and an underlying rotating shaft without requiring reservation of additional axial space beyond what is occupied by the axial length of the secondary seal itself. The disclosed design can be incorporated into a high temperature end face secondary seal drive collar assembly that has a shortened axial installation length requirement as compared to traditional designs, because the disclosed design does not require axial engagement of fasteners to compress the secondary sealing element, which in embodiments is a graphite sealing element, against the sleeve and shaft. Instead, the secondary sealing element is compressed by radial engagement of the fasteners.

In particular, the present invention includes a single ring drive collar that comprises a plurality of radially directed tapped holes into which bolts or other fasteners are installed. As the bolts are tightened in the tapped holes, they enter a cylindrical cavity provided in the drive collar, and impact therein upon a sloped surface of a crush ring. The vertical force applied by the fasteners to the sloped surface of the crush ring displaces the crush ring axially into the secondary sealing element, thereby crushing the secondary sealing element against the seal face adaptor sleeve and the shaft, and forming a seal there between.

Described in more detail, the disclosed secondary seal includes an annular, crushable, non-elastomeric secondary sealing element, which in embodiments is made of graphite. The secondary sealing element coaxially surrounds the rotating shaft in contact with the outer diameter of the shaft. The secondary sealing element is bounded on a distal side thereof by a distal compression ring, which is rotationally and axially fixed to the shaft. In embodiments, the distal compression ring is a rotating seal face adaptor sleeve having a beveled end face. On its proximal side, the secondary sealing element is bounded by a distal, beveled surface of a crush ring.

The secondary seal further includes a single ring drive collar that is axially fixed to the shaft and seal face adaptor sleeve and includes a cylindrical cavity provided in a distal face thereof. The drive collar, cylindrical cavity, crush ring, secondary sealing element, and seal face adaptor sleeve are all coaxial with the longitudinal axis of the shaft. The crush ring is nested within the cylindrical cavity of the drive collar. In embodiments, the cylindrical cavity further contains the secondary sealing element, and in some of these embodiments the cylindrical cavity also contains a proximal end of the seal face adaptor sleeve.

A plurality of radially directed tapped holes extend through the drive collar into the cylindrical cavity, each of the tapped holes containing a threaded fastener such as a bolt. The tapped holes and fasteners are spaced about a circumference of the drive collar, and are all located in a common plane that is perpendicular to the shaft.

A proximal face of the crush ring includes a sloped portion. Before the secondary sealing element is compressed, the sloped portion of the crush ring underlies the tapped holes. Tightening of the fasteners causes the fasteners to impact the sloped portion of the crush ring, such that continued tightening of the fasteners forces the crush ring axially toward the secondary sealing element, crushing the secondary sealing element against the seal face adaptor sleeve and shaft, and forming a seal therebetween.

In embodiments, the sloped portion of the proximal face of the crush ring terminates in a vertical portion. According to these embodiments, upon sufficient axial displacement of the crush ring, the sloped portion is no longer beneath the fasteners, such that continued tightening of the fasteners causes sides of the fasteners to abut the vertical portion of the crush ring's proximal face, thereby maintaining but not further increasing the axial pressure that is applied to the crush ring. In some of these embodiments, continued tightening of the fasteners causes them to impact the shaft, thereby fixing the drive collar to the shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a high temperature seal design that is able to form a seal between a cylindrical shaft or tube and a surrounding collar or other member without employing elastomers, and without requiring reservation of additional axial space beyond what is occupied by the axial length of the seal itself. The invention is described herein with reference to a secondary seal of an end face mechanical seal assembly formed between an adaptor sleeve of a rotating seal face and an underlying rotating shaft. However, it will be understood that the invention is not limited to only this example, but is applicable to the sealing of any shaft or tube to any surrounding sleeve or collar.

The disclosed design can be incorporated into a high temperature end face secondary seal drive collar assembly that has a shortened axial installation length requirement as compared to traditional designs, because the disclosed design does not require axial engagement of fasteners to compress the secondary sealing element, which in embodiments is a graphite sealing element, against the sleeve and shaft.

Figure 2A:
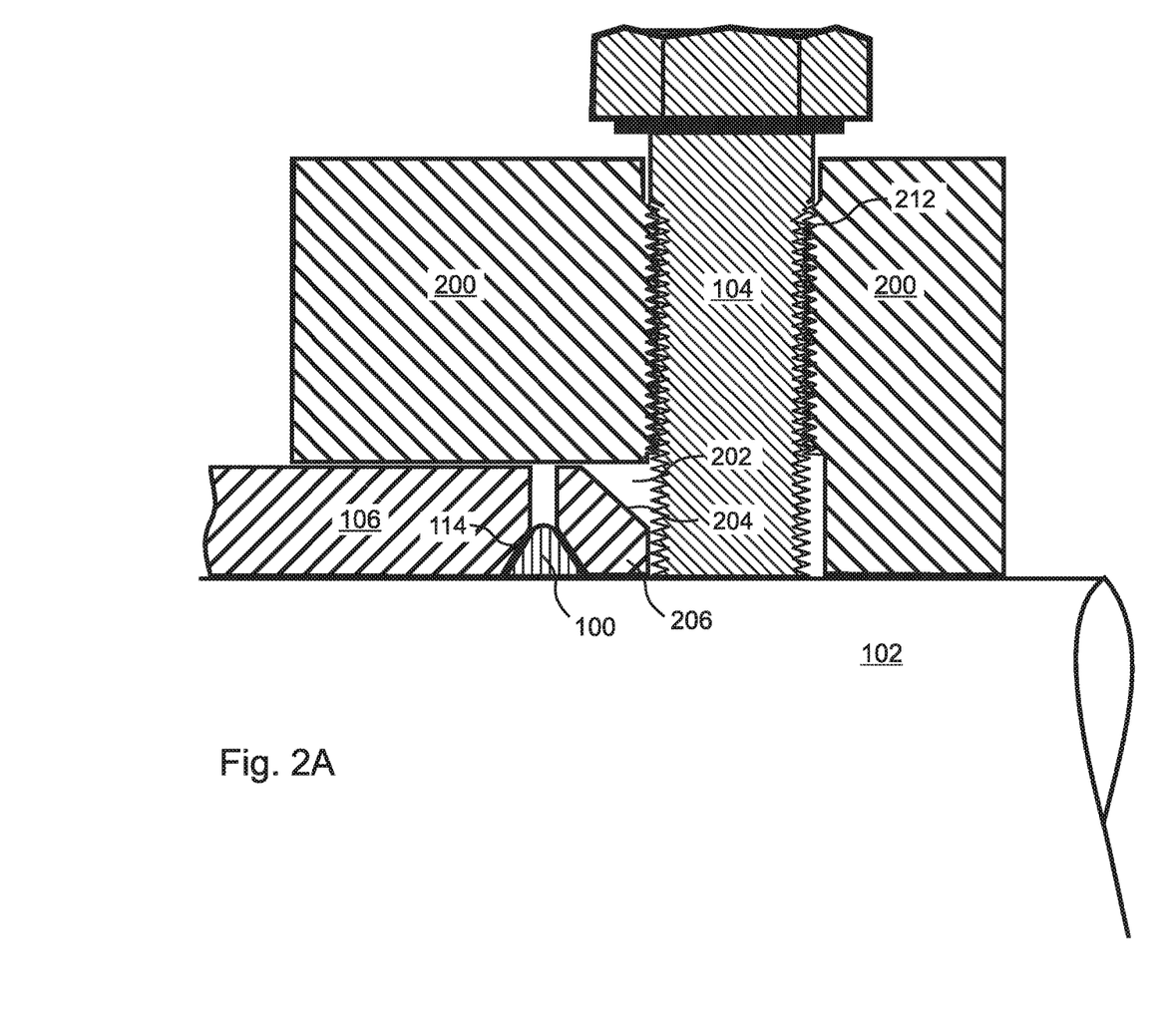
FIG. 2A is a cross sectional illustration of a high temperature secondary seal according to an embodiment of the present invention.

More specifically, with reference to FIG. 2A, the present invention includes a single ring drive collar 200 that comprises a plurality of radially directed tapped holes 212 having bolts 104 or other fasteners installed therein. As the bolts 104 are tightened into the tapped holes 212, they enter a cylindrical cavity 202 provided in the drive collar 200, and impact therein upon a sloped surface 204 of a crush ring 206. The vertical force applied by the fasteners 104 to the sloped surface 204 of the crush ring 206 displaces the crush ring 206 axially into the secondary sealing element 100, thereby crushing the secondary sealing element 100 against the seal face adaptor sleeve 106 and shaft 102, and forming a seal there between.

Figure 2B:
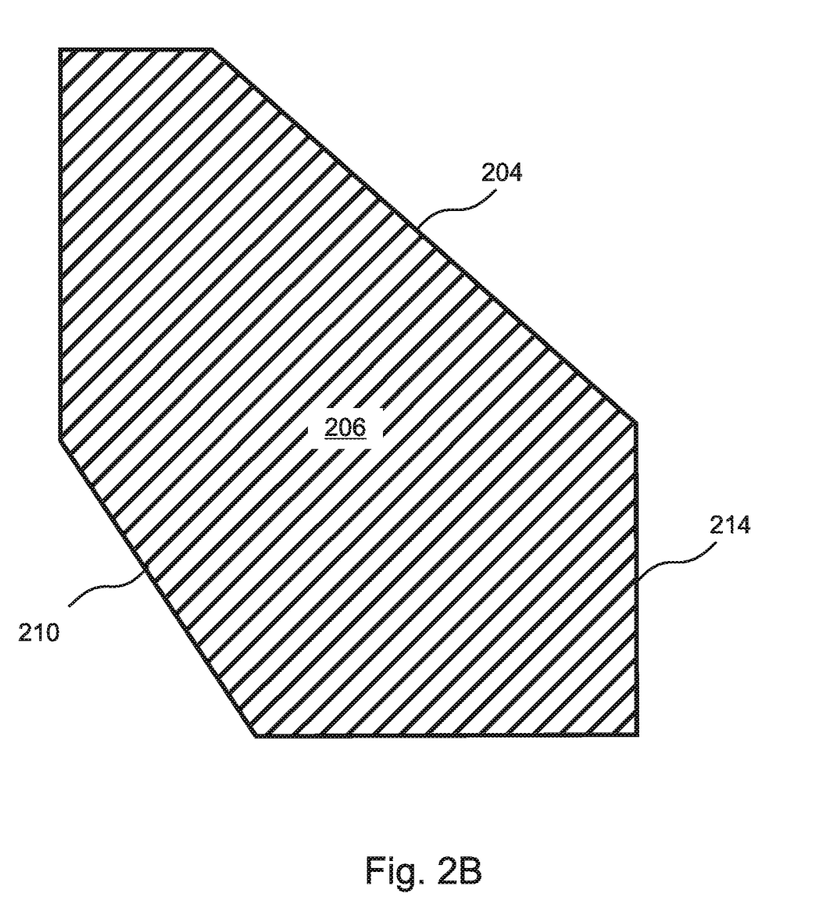
FIG. 2B is an enlarged cross sectional illustration of the crush ring of FIG. 2A.

Described in more detail with reference to FIG. 2A, the disclosed secondary seal includes an annular, crushable, non-elastomeric secondary sealing element 100, which in embodiments is made of graphite. The secondary sealing element 100 coaxially surrounds the rotating shaft 102 in contact with the outer surface of the shaft 102. The secondary sealing element 100 occupies a space that is bounded on a distal side thereof by a proximal face of a distal compression ring 106, which is axially fixed to the shaft 102. In embodiments, the distal compression ring 106 is a rotating seal face adaptor sleeve 106 having a beveled end face 114 configured to compress the secondary sealing element proximally and downwardly. On its proximal side, the space occupied by the secondary sealing element 100 is bounded by a distal, beveled surface 210 of a crush ring 206. An enlarged illustration of the crush ring 206 of FIG. 2A is presented in FIG. 2B.

The secondary seal further includes a single ring drive collar 200 having a cylindrical cavity 202 provided in a distal end thereof coaxial with the longitudinal axis of the shaft 102. The crush ring 206 is nested within the cylindrical cavity 202 of the drive collar 200. In the embodiment of FIG. 2A, the cylindrical cavity 202 further contains the secondary sealing element 100 and a proximal end of the seal face adaptor sleeve 106.

A plurality of radially directed tapped holes 212 extend through the drive collar 200 into the cylindrical cavity 204, each of the tapped holes 212 containing a threaded fastener such as a bolt 104. The tapped holes 212 and fasteners 104 are spaced about a circumference of the drive collar 200, and are all located in a common plane that is perpendicular to the shaft 102.

Figure 3A:
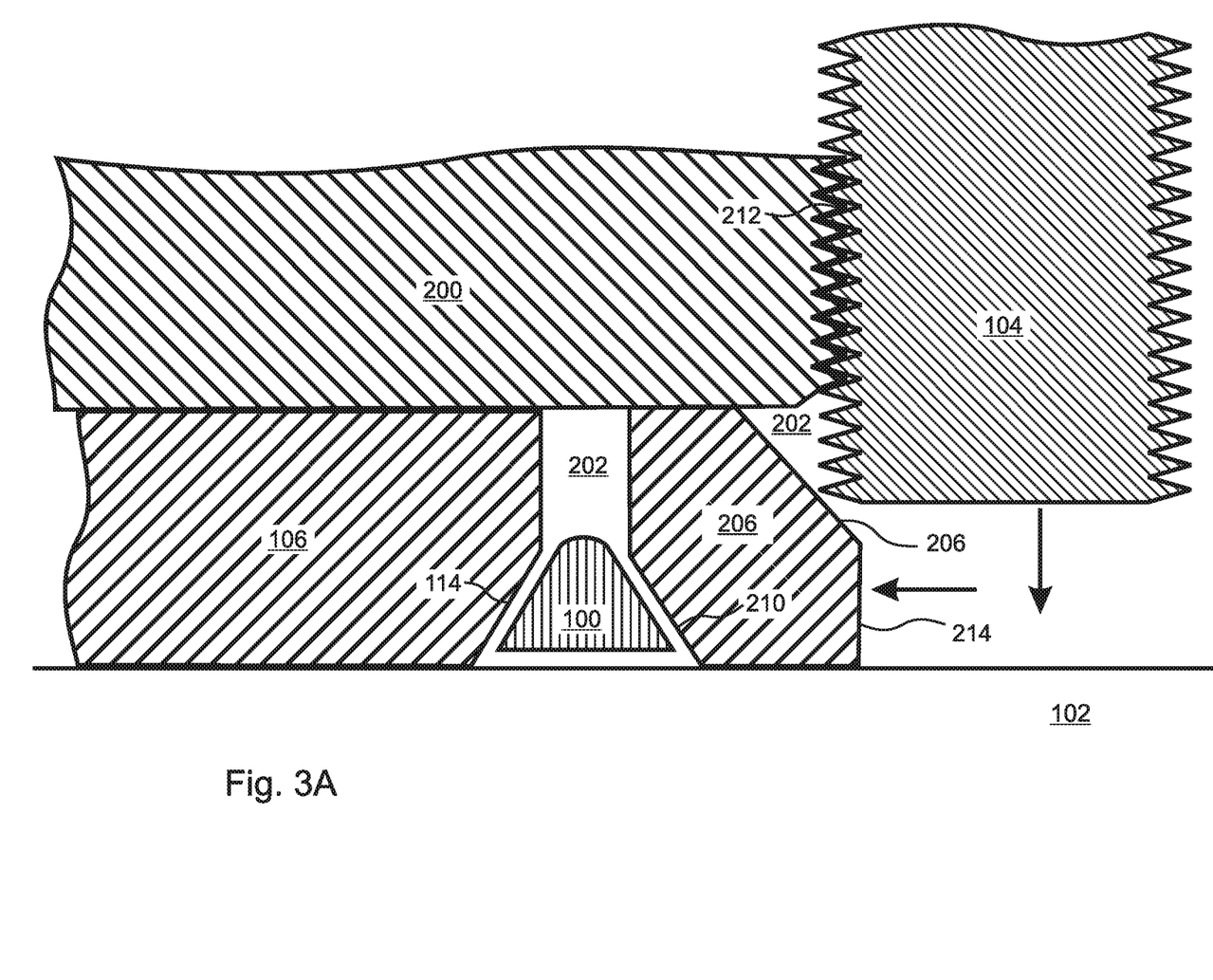
FIG. 3A is a cross sectional illustration of an enlarged region of the embodiment of FIG. 2A, shown before compression of the secondary sealing element.

A proximal face of the crush ring 206 includes a sloped portion 204. With reference to FIG. 3A, before the secondary sealing element 100 is compressed, the sloped portion 204 of the crush ring 206 underlies the fasteners 104 installed in the tapped holes 212. Tightening of the fasteners 104 causes the fasteners 104 to impact the sloped portion 210 of the crush ring 206, and continued tightening of the fasteners 104 forces the crush ring 206 axially toward the secondary sealing element 100, crushing the secondary sealing element 100 against the seal face adaptor sleeve 106 and the shaft 102, and forming a seal therebetween.

Figure 3B:
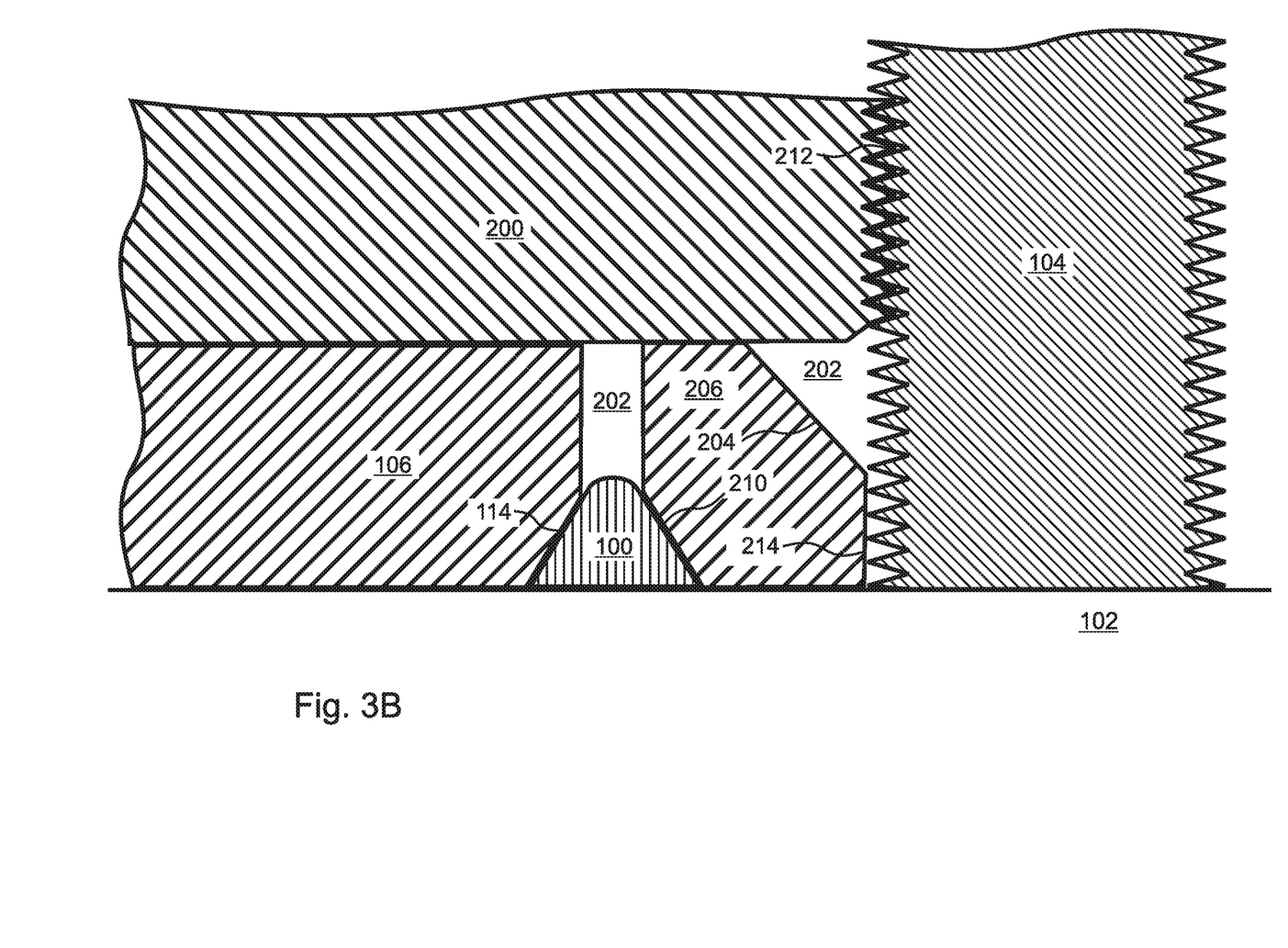
FIG. 3B is a cross sectional illustration of the enlarged region of FIG. 3A, shown after compression of the secondary sealing element.

With reference again to FIG. 2B, in embodiments the sloped portion 204 of the proximal face of the crush ring 206 terminates in a vertical portion 214. According to these embodiments, and with reference to FIG. 3B, upon sufficient axial displacement of the crush ring 206, the sloped portion 204 is no longer beneath the fasteners 104, such that continued tightening of the fasteners 104 causes side of the fasteners to abut the vertical portion 214 of the proximal face of the crush ring 206, thereby maintaining, but not increasing, the axial pressure that is applied to the secondary sealing element 100. As shown in FIG. 3B, in some of these embodiments continued tightening of the fasteners 104 causes them to impact the shaft 102, thereby fixing the drive collar 200 to the shaft 102 and obviating any need for some other mechanism to fix the drive collar 200 to the shaft 102.

It is notable that an added benefit of the present invention is that it facilitates installation of the secondary seal, as compared to prior approaches such as FIG. 1. In particular, it has been found that for designs such as FIG. 1, installation of the secondary sealing element 100 onto the shaft 102, typically by manual manipulation of the secondary sealing element 100, can be difficult. This is due, at least in part, to the deformable nature of the graphite secondary sealing element. However, in embodiments of the present invention, the crush ring 206 can be installed on the shaft 102 together with the secondary sealing element 100, such that the crush ring serves as a de-facto installation tool for the secondary sealing element 100, eliminating the need to directly, manually manipulate the secondary sealing element 100 and thereby facilitating assembly of the secondary seal.

It is further notable that in embodiments the disclosed secondary seal can be installed as a retrofit in combination with an existing shaft 102 and rotating seal face adaptor sleeve 106 that were previously sealed to each other using a conventional secondary seal such as is shown in FIG. 1, or that were designed with the intent of being sealed by such a conventional secondary seal.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A high temperature seal assembly operable to form a seal between a shaft and a sleeve that surrounds and is axially fixed to the shaft, the seal assembly comprising:
    a crush ring surrounding and coaxial with the shaft and proximally offset from the sleeve, a proximal face of the crush ring comprising a sloped portion;
    a deformable, non-elastomeric secondary sealing element surrounding and coaxial with the shaft, the secondary sealing element being axially located between the sleeve and the crush ring;
    a drive collar surrounding and coaxial with the shaft, the drive collar being proximally offset from the crush ring;
    a cylindrical cavity formed in the drive collar, the cylindrical cavity being coaxial with the shaft and extending to a distal face of the drive collar;
    a plurality of tapped holes radially penetrating through the drive collar from an outer boundary of the drive collar to the cylindrical cavity, all of the tapped holes lying in a common plane that is perpendicular to the shaft axis, the crush ring being axially positioned such that the sloped portion of the crush ring extends beneath the tapped holes, each of the tapped holes having a threaded fastener installed therein;
    the seal assembly being configured such that radially inward advancement of the fasteners, due to rotation thereof, causes radially inward ends of the fasteners to impact the sloped portion of the crush ring, resulting in axial displacement of the crush ring toward the sleeve and compression of the secondary sealing element between the crush ring and the sleeve, whereby a seal is formed by the secondary sealing element between the sleeve and the shaft.

2. The seal assembly of claim 1, wherein the sleeve is a rotating seal face adaptor sleeve.

3. The seal assembly of claim 1, wherein the secondary sealing element is made of graphite.

4. The seal assembly of claim 1, wherein the crush ring is entirely contained within the cylindrical cavity.

5. The seal assembly of claim 1, wherein the secondary sealing element is located within the cylindrical cavity.

6. The seal assembly of claim 1, wherein a proximal portion of the sleeve extends within the cylindrical cavity.

7. The seal assembly of claim 1, wherein the seal assembly is a secondary seal of an end face mechanical seal assembly.

8. The seal assembly of claim 1, wherein the proximal face of the sleeve and the distal face of the crush ring both include chamfers such that the compression therebetween of the secondary sealing element is both axial and radially inward.

9. The seal assembly of claim 1, wherein the sloped portion of the crush ring terminates proximally in a radially vertical portion.

10. The seal assembly of claim 9, wherein the seal assembly is configured such that the axial displacement of the crush ring toward the sleeve due to radially inward advancement of the fasteners continues until the sloped portion is no longer beneath the tapped holes, and such that subsequent advancement of the fasteners causes sides of the fasteners to abut the vertical portion of the crush ring.

11. The seal assembly of claim 10, wherein the seal assembly is configured such that sufficient radially inward advancement of the fasteners causes the radially inward ends of the fasteners to impact the shaft, thereby fixing the drive collar to the shaft.

\* \* \* \* \*